United States Patent [19]

Bouette

[11] 4,418,089
[45] Nov. 29, 1983

[54] METHOD AND APPARATUS FOR PRODUCING A CELLULAR FOOD PRODUCT

[75] Inventor: David W. Bouette, Macclesfield, England

[73] Assignee: Simon-Vicars Limited, Merseyside, England

[21] Appl. No.: 347,347

[22] Filed: Feb. 9, 1982

[51] Int. Cl.³ .......................... A23G 1/10; A23G 3/00
[52] U.S. Cl. .................................... 426/572; 426/316;
426/477; 426/516; 426/564; 426/660; 99/483;
99/516; 99/323.4; 366/149
[58] Field of Search ............... 426/564, 576, 317, 477,
426/613, 572, 660; 99/483, 516, 323.4; 366/149

[56] References Cited

U.S. PATENT DOCUMENTS

| | | |
|---|---|---|
| 2,970,917 | 2/1961 | Melnick ............................... 426/564 |
| 2,976,154 | 3/1961 | Brown et al. ....................... 426/564 |
| 3,224,740 | 12/1965 | Kuehn et al. ....................... 426/564 |
| 3,556,812 | 1/1971 | Krohn ................................. 426/572 |
| 3,649,302 | 3/1972 | Daggy ................................. 426/564 |
| 3,798,337 | 3/1974 | Abalo ................................. 426/572 |
| 3,894,159 | 7/1975 | Franka ................................ 426/572 |
| 4,004,040 | 1/1977 | Puta .................................... 426/564 |

Primary Examiner—Jeanette M. Hunter
Attorney, Agent, or Firm—LeBlanc, Nolan, Shur & Nies

[57] ABSTRACT

A method and apparatus for producing a cellular chocolate product in which a supply of chocolate is heated to bring it to a molten state, a gas which is largely soluble in the chocolate is introduced into the molten chocolate under pressure, the molten chocolate is fed under pressure into a mixing device having closely adjacent relatively movable parts, the mixing device is operated to disperse the gas uniformly, so that it is dissolved throughout the molten chocolate, the liquid chocolate is passed through a restricted orifice to release the pressure suddenly to atmosphere, so that the dissolved gas forms gaseous bubbles in the chocolate and the liquid chocolate is solidified into a finally resulting chocolate product by cooling. The clearance between at least some of the closely adjacent relatively movable mixing parts of the mixing device is less than half the minimum transverse dimension of the orifice and preferably less than one quarter so that any pieces of re-cycled filler, such as biscuit, are thoroughly ground within the chocolate so that little or no blockage of the orifice occurs.

14 Claims, 4 Drawing Figures

METHOD AND APPARATUS FOR PRODUCING A CELLULAR FOOD PRODUCT

The present invention relates to a method and apparatus for producing a cellular food product.

It has been proposed iun our copending application No. 30595/78 to manufacture an aerated food product, such as chocolate, in which the chocolate is mixed with a soluble gas, such as carbon dioxide, under very high pressure, and the pressure is released suddenly, so that the carbon dioxide comes out of solution and forms bubbles in the chocolate product. This is achieved by passing the pressurised chocolate, together with the carbon dioxide mixed therein, through a sharp edged valve, the product then passing to atmospheric pressure. This is very satisfactory for producing a cellular chocolate product continuously. It would be useful to be able to use the same method for producing a filled chocolate product, for example a chocolate covered biscuit.

One way of making such a biscuit is to fill the mould with tempered chocolate, and to keep the mould and chocolate warm, and then to invert the mould and shake it out partially to empty the mould, and then to turn the mould the right way up to leave the shell of choclate in the mould. This semi-liquid shell is then filled with the biscuit or other filling and the mould is then overfilled with more chocolate. The mould is then vibrated to remove the voids and is finally wiped off to give a clean smooth surface, to what would be the bottom of the biscuit after cooling and demoulding.

It will be appreciated that during the course of such an operation various faults do occur which result in the product being rejected after removing from the mould. Furthermore, whole or broken pieces of biscuit can get into the chocolate stream after the final wiping off stage.

All the rejected material is valuable, because the chocolate is a very expensive raw material. For economic reasons, therefore, it is advantageous to return the chocolate, together with any biscuit or other filling bits for re-use. The traditional method of doing this, therefore, is to grind up the material which is returned with some fresh chocolate, to create a suitable fluid paste which is then added to the main chocolate stream at a rate of about 5%. This is perfectly satisfactory for conventional chocolate handling apparatus. However, it has been found that when using the above mentioned cellular chocolate making process, problems do occur, because the ground up material is not sufficiently small readily to pass through the orifice in the valve which is necessary to produce the sudden pressure drop. The small lumps which arise will block the orifice of the valve and so the operation will have to be stopped. Clearly this is not satisfactory for economic operation.

While it is possible to strain or filter out any such oversized lumps before the chocolate stream has the gas dissolved in it, or before it is deposited, if this is done, the net amount of material recycled is reduced, affecting the economics of the overall process.

It is now proposed to provide a method of making a cellular chocolate product, comprising the steps of heating a supply of chocolate to bring it to a molten state, introducing into the molten chocolate under pressure, a gas which is largely soluble in the chocolate, feeding the molten chocolate under pressure into a mixing device having closely adjacent relatively movable mixing parts, operating the mixing device to disperse the gas uniformly, so that it is dissolved throughout the molten chocolate, passing the molten chocolate through a restricted orifice to release the pressure suddenly to atmosphere, so that the dissolved gas forms gaseous bubbles within the chocolate and solidifying the molten chocolate into a finally resulting cellular chocolate product by cooling, the clearance between the closely adjacent relatively movable mixing parts of the mixing device being less than half of the minimum transverse dimension of the orifice.

If the molten chocolate includes refeed material, including refed pieces of biscuit material, the fact that the clearance between the relatively movable mixing parts is less than half the minimum transverse dimension of the orifice, ensures that a thorough grinding of the solid particles within the chocolate is achieved and little or no blockage of the orifice occurs.

Preferably, the clearance between the relatively movable mixing parts of the mixing device is of the order of one quarter of the minimum transverse dimension of the orifice. It has been found, for example, that an effective clearance in the mixer of 0.5 millimeters will prevent blockage of a 2 millimeter diameter orifice used in the nearly open position.

This is rather a surprising result since there is evidence that if the material is more finely ground than at present at an earlier stage in the process, then particle agglomerates can occur which will still occasionally block the orifices. Such a blocking does not occur using the method of the invention, and it of course saves the necessity for a fine grinding apparatus upstream of the mixing device.

The invention also provides apparatus for producing a cellular chocolate product, according to the aforesaid method.

In order that the present invention may more readily be understood, the following description is given, merely by way of example, reference being made to the accompanying drawings, in which.

Figure 1:
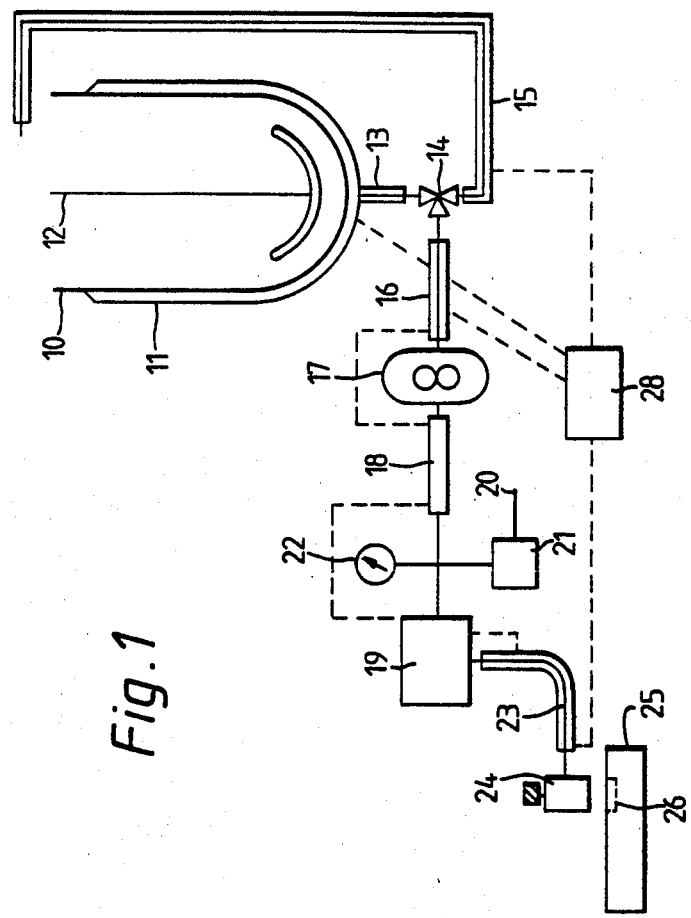
FIG. 1 is a schematic view of one embodiment of apparatus according to the invention.
Figure 4:
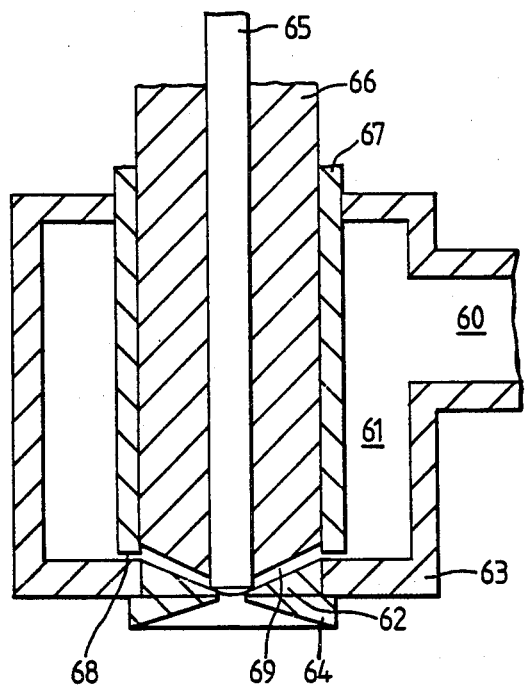

and FIG. 4 is a schematic cross-section through a valving arrangement used in the apparatus of fIG. 1.

Referring first to FIG. 1, a tank 10 having a surrounding water jacket 11 is provided with a stirring device 12. A jacketed outlet pipe 13 passes through a three-way plug cock 14 which has a first connection 15 for returning material to the tank and a second connection 16 leading to a positive displacement pump 17, the outlet 18 of which feeds product to a continuous mixer 19 further details of which are described below with reference to FIGS. 2 and 3.

Fed into the line 18, via a gas inlet 20, is a stream of carbon dioxide, the flow of which is measured by a fluid meter 21. A pressure gauge 22 measures the pressure of the gas and liquid at the inlet to the mixer 19. The outlet 23 of the mixer 19 is connected to a variable orifice valve indicated by the general reference numeral 24 to be described in more detail later with reference to FIG. 4. The material leaving the valve 24 is, in effect extruded in dosed quantities onto a plate 25 having a mould 26 formed therein.

The whole of the system from the tank 10 to the valve 24 is enclosed in a jacket, only the jacket 11 around the tank 10 being indicated by a reference numeral. The jacket system is fed from a supply of hot water 28 as indicated by chain dotted lines in FIG. 1. The valve 24 is illustrated in greater detail in FIG. 4 and includes a product inlet 60 connected to the outlet 23 of the mixer 19. The inlet 60 extends into a chamber 61 having a lower end wall 63 in which is located a fixed valve plate 62. A second valve plate 64 is located below valve plate 62 and is slidable across the lower face thereof by any suitable means (not shown) to effect preadjustment of the flow passage through the orifices of the two valve plates 62 and 64.

Within the chamber 61 is a rod 65 which is axialy aligned with the orifice formed in the upper valve plate 62, the lower end of the rod 65 being shaped to conform to the shape of said orifice. A hollow piston 66 is axially slidable so that its internal surface is in sliding contact with the external surface of the rod 65. Similarly, a sleeve 67 is axially slidable with its inner surface in contact with the outer surface of the piston 66.

Figure 2:
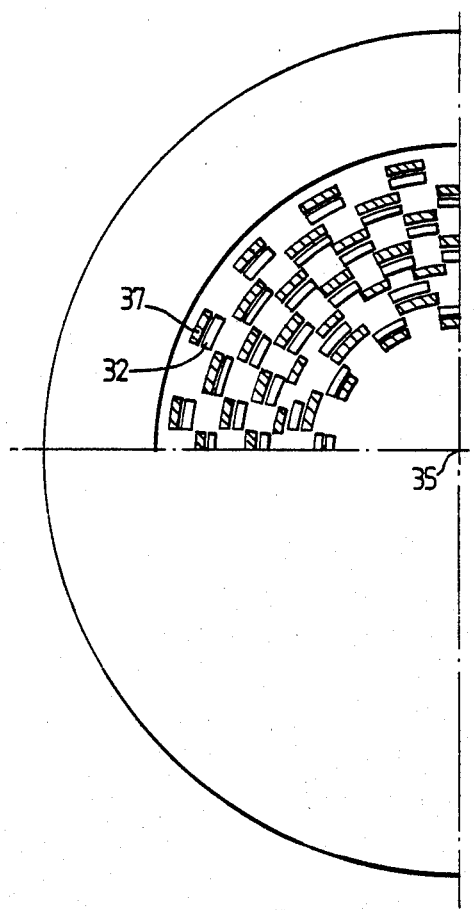
FIG. 2 is an enlarged fragmentary elevation, partly in section, showing a portion of the mixing device used in the apparatus of FIG. 1.
Figure 3:
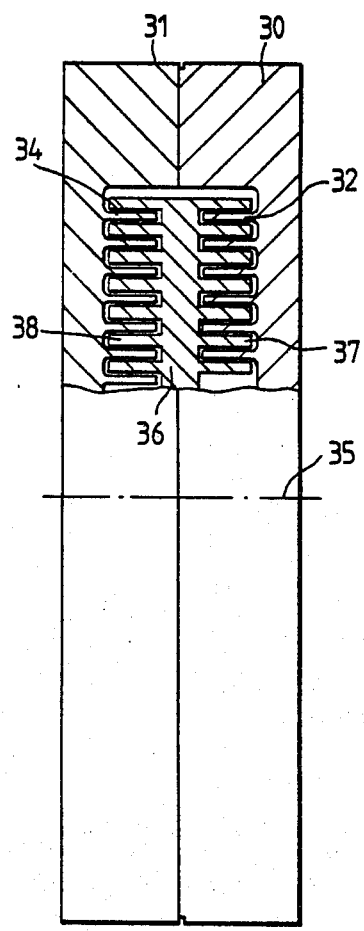
FIG. 3 is a cross-section through the mixing device of FIG. 2.

If reference is now made to FIGS. 2 and 3, more details of the mixer 19 are illustrated therein. The mixer 19 includes two casing parts 30 and 31 (FIG. 3) having thereon concentric arrays of circumferentially spaced teeth 32 and 34 respectively, there being six arrays 32 and seven arrays 34.

Rotatable about the axis 35 is a shaft (not shown) carrying a rotor 36 having axially extending concentric arrays of circumferentially spaced teeth 37 and 38 thereon. The arrays 37 and 38 are located respectively between the arrays 32 and 34 of the housing 30, 31. The inlet and the outlet to the mixer are provided adjacent the axis 35, so that material being mixed flows first radially outwardly along one face of the rotor to the periphery and the radially inwardly along the other face, being subjected to a substantial shearing effect by the interaction of the teeth.

The clearance between the relatively moving mixing parts constituted by the teeth 37, 38 on the rotor 36 and the teeth 32, 34 on the housing 30, 31, is very small, preferably being of the order of 0.5 millimeters. The orifice in the valve plates 62, 64 of the valving arrangement illustrated in FIG. 4 is preferably adjusted to approximately a 2 millimeter diameter.

In operation, to produce an aerated or cellular chocolate product, chocolate is placed in the tank 10 and is melted by holding the temperature of the tank 10 at about 35° and by operating the stirrer 12. Added to this chocolate is scrap material which may include broken biscuit etc, the scrap material being preground and being added at the rate of approximately 5%.

The molten chocolate is fed from the tank at a metered rate by the pump 17 and is fed into the continuous mixer 19 having the fine clearance mentioned above. Carbon dioxide, at a pressure of about 10.5 kilograms per square centimeter gauge, is metered by the flow meter 14 into the stream of chocolate prior to entering the mixer 19. The carbon dioxide is largely soluble in the chocolate to the extent of being 85% or higher soluble at the rate fed.

In the mixer, the carbon dioxide is dispersed uniformly throughout the chocolate and the pressure, as measured via the gauge 22, is held at about 6 kilograms per square centimeter gauge, with substantially all the carbon dioxide dissolved in the chocolate. The mixer also serves to chop up any solids, for example particles of biscuit, which may be in the mix, and make this sufficiently small so that the mixed product can be delivered through the outlet conduit 23 to the valve 24 so that the particle size is smaller than the outlet orifice in the valve.

With regard to the valve, the rod 65 is lowered to close the orifice in the valve plates, and the piston 66 and the sleeve 67 are raised so that a gap 68, 69 is provided below the sleeve and the piston. The sleeve 67 is then lowered, so that it contacts the plate or end wall 63, thus entrapping product, under pressure, below the piston and around the rod 65. The rod 65 is then raised and the piston 66 lowered together, so that the product is forced out, still under pressure through the orifices. As indicated, the particle size of any solids in the chocolate has been rendered sufficiently small to pass readily through the orifices. The volume which is discharged at each movement can be determined by suitable previous displacement upwardly of the piston 66. Thus, a measured quantity of chocolate can be discharged at each operation and when the measured quantity has been discharged, the rod 65 is once again forced into the orifice abruptly to cut off the flow, without disturbing the preadjustment of cross-section of the flow passage through the orifices of the valve.

It will be appreciated that the type of valve illustrated gives a sharp pressure drop in the product, so that the dissolved gas nucleates into bubbles to produce an aerated product which is provided in the moulds 26 formed in the moulding plate 25. As the gas forms into bubbles, the chocolate cools, on re-entering the atmosphere, and begins to solidify. A biscuit can be inserted into the mould in the manner described earlier, and any scrap which is removed, can be returned to the tank 10.

By way of comparison, one embodiment of mixer proposed according to the present invention has 124 teeth per side on the rotor and 104 teeth per side on the casing or stator, to give a radial clearance of 0.5 millimeters, whereas, a typical mixer as used in the process of application Ser. No. 30595/78 has 84 teeth per side on the rotor and 76 teeth per side on the casing or stator, with a radial clearance of 1.6 millimeters.

I claim:

1. A method of making a cellular chocolate product, comprising the steps of heating a supply of chocolate to bring it to a molten state, introducing into the molten chocolate under pressure a gas which is largely soluble in the chocolate, feeding the molten chocolate under pressure into a mixing device having closely adjacent relatively movable mixing parts, operating the mixing device to disperse the gas uniformly, so that it is dissolved throughout the molten chocolate, passing the molten chocolate through a restricted orifice to release the pressure suddenly to atmosphere, so that the dissolved gas forms gaseous bubbles within the chocolate, and solidifying the molten chocolate into a finally resulting cellular chocolate product by cooling, the clearance between the closely adjacent relatively movable mixing parts of the mixing device being less than half the minimum transverse dimension of the orifice.

2. A method according to claim 1, wherein the clearance between the relatively movable parts of the mixing device is of the order of one quarter of the minimum transverse dimension of the orifice.

3. A method according to claim 2, wherein said clearance is 0.5 millimeters and the minimum transverse dimension of the orifice is 2 millimeters.

4. The method of claim 1 wherein the mixing device includes a housing having concentric arrays of circumferentially spaced teeth and a rotor which is rotatable about an axis within the housing, said rotor having axially extending concentric arrays of circumferentially spaced teeth, said arrays of the rotor being located respectively between said arrays of the housing and wherein the clearance between the teeth of respective arrays of the housing and rotor is less than half the minimum transverse dimension of the orifice.

5. The method of claim 4 wherein said housing includes a pair of opposed casing portions, each casing portion having concentric arrays of circumferentially spaced teeth located therein and wherein said rotor has a pair of faces which are substantially aligned with said casing portions, said concentric arrays of said rotor being located on each face of said rotor, so that material being mixed flows first radially outwardly along one face of the rotor to the periphery and then radially inwardly along the other face, such material being subjected to a substantial shearing effect by the interaction of the teeth.

6. The method of claim 1 wherein said restricted orifice is formed in a valve member which includes a product inlet connected to the mixing device, said product inlet extending into a chamber having a lower end wall in which is located a fixed valve plate with orifice therein, and with a second valve plate with orifice therein being located below said fixed valve plate, said second valve plate being slidable across the lower face of the fixed valve plate to effect preadjustment of the flow passage through the orifices of said valve plates.

7. The method of claim 6 wherein a rod is positioned within said chamber in axial alignment with the orifice of the fixed valve plate, the lower end of said rod being shaped to conform to the shape of said orifice of the fixed valve plate and with said rod being axially slidable to open and close the orifices of said valve plates, a hollow piston concentric with said rod and being axially slidable so that its internal surface is in sliding contact with the external surface of the rod, and a sleeve concentric with said rod and hollow piston and being axially slidable with its inner surface in sliding contact with the outer surface of the piston; and wherein said step of passing the molten chocolate through a restricted orifice to release the pressure suddenly to atmosphere includes lowering the rod to close the orifices of said valve plates, raising the piston and sleeve to create a gap therebelow, lowering the sleeve to contact said lower end wall, thus entrapping product under pressure below the piston and around the rod, then raising the rod and lowering the piston together so that product is forced out under pressure through the orifices.

8. Apparatus for producing a cellular chocolate product, the apparatus comprising a mixing device having closely adjacent relatively movable parts, means for supplying chocolate in a molten state and introducing it into the mixing device under pressure, means for introducing a gaseous component into the mixing device under pressure, whereby it is uniformly dispersed in the molten chocolate by the mixing device, an outlet conduit for delivering the mixed product from the mixing device, a restricted orifice in the outlet conduit for releasing the pressure in the mixed product suddenly to atmosphere, and means to receive the finally resulting cellular chocolate product from the orifice, and on which the product is solidified by cooling, the clearance between at least some of the closely adjacent relatively movable mixing parts of the mixing device being less than half the minimum transverse dimension of the orifice in the outlet conduit.

9. Apparatus according to claim 8, wherein the clearance between the relative movable parts of the mixing device is of the order of one quarter of the minimum transverse dimension of the orifice.

10. Aparatus according to claim 9, wherein said clearance is 0.5 millimeters and the minimum transverse dimension of the orifice is 2 millimeters.

11. The apparatus of claim 8 wherein the mixing device includes a housing having concentric arrays of circumferentially spaced teeth and a rotor which is rotatable about an axis within the housing, said rotor having axially extending concentric arrays of circumferentially spaced teeth, said arrays of the rotor being located respectively between said arrays of the housing and wherein the clearance between the teeth or respective arrays of the housing and rotor is less than half the minimum transverse dimension of the orifice.

12. The apparatus of claim 11 wherein said housing includes a pair of opposed casing portions, each casing portion having concentric arrays of circumferentially spaced teeth located therein and wherein said rotor has a pair of faces which are substantially aligned with said casing portions, said concentric arrays of said rotor being located on each face of said rotor, so that material being mixed flows first radially outwardly along one face of the rotor to the periphery and then radially inwardly along the other face, such material being subjected to a substantial shearing effect by the interaction of the teeth.

13. The apparatus of claim 8 wherein said restricted orifice is formed in a valve member which includes a product inlet connected to the mixing device, said product inlet extending into a chamber having a lower end wall in which is located a fixed valve plate with orifice therein, and with a second valve plate with orifice therein being located below said fixed valve plate, said second valve plate being slidable across the lower face of the fixed valve plate to effect preadjustment of the flow passage through the orifices of said valve plates.

14. The apparatus of claim 13 wherein a rod is positioned within said chamber in axial alignment with the orifice of the fixed valve plate, the lower end of said rod being shaped to conform to the shape of said orifice of the fixed valve plate and with said rod being axially slidable to open and close the orifices of said valve plates, a hollow piston concentric with said rod and being axially slidable so that its internal surface is in sliding contact with the external surface of the rod, and a sleeve concentric with said rod and hollow piston and being axially slidable with its inner surface in sliding contact with the outer surface of the piston.

* * * * *